United States Patent [19]

Boundy

[11] 4,040,450
[45] Aug. 9, 1977

[54] PIPE SEALING APPARATUS

[75] Inventor: Geoffrey A. Boundy, Parafield Gardens, Australia

[73] Assignee: Glenys Irene Boundy, Parafield Gardens, Australia

[21] Appl. No.: 624,407

[22] Filed: Oct. 20, 1975

[30] Foreign Application Priority Data

Oct. 28, 1974 Australia .............................. 9391/74

[51] Int. Cl.² ........................................... F16L 55/12
[52] U.S. Cl. .................................................. 138/94
[58] Field of Search ........................... 138/94, 89, 178

[56] References Cited

U.S. PATENT DOCUMENTS

| 386,446 | 7/1888 | Bailey et al. | 138/94 |
| 411,978 | 10/1889 | Chisholm | 138/94 |
| 1,181,984 | 5/1916 | Arni | 138/94 X |
| 2,812,778 | 11/1957 | Ver Nooy | 138/94 |
| 3,774,646 | 11/1973 | Smith | 138/94 X |

Primary Examiner—Richard E. Aegerter
Assistant Examiner—James E. Bryant, III
Attorney, Agent, or Firm—McNenny, Pearne, Gordon, Gail, Dickinson & Schiller

[57] ABSTRACT

A drain pipe sealing device wherein a sealing head is supported at the end of a support arm whereby the sealing head can be orientated so as to facilitate entry of the sealing head by way of a vertical riser and then re-orientated to assist in sealing.

7 Claims, 5 Drawing Figures

U.S. Patent  Aug. 9, 1977  Sheet 1 of 2  4,040,450
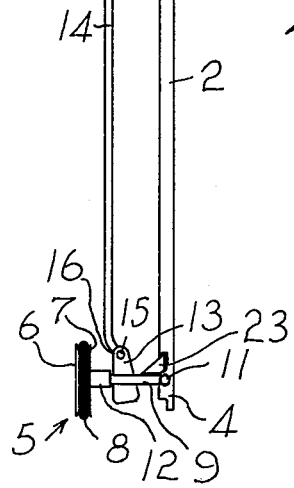
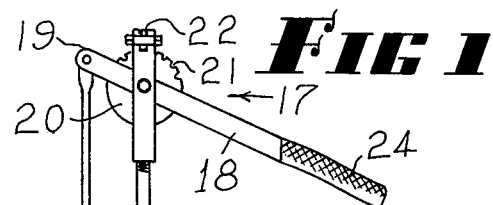
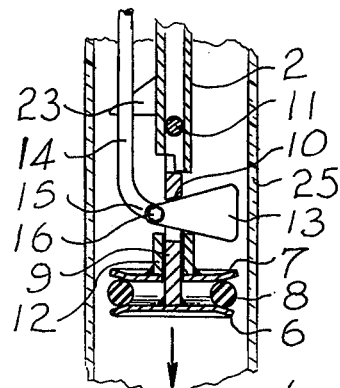
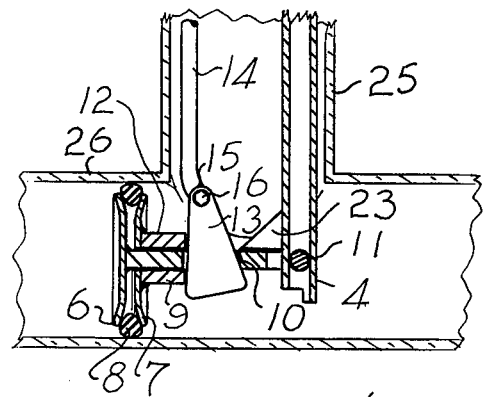

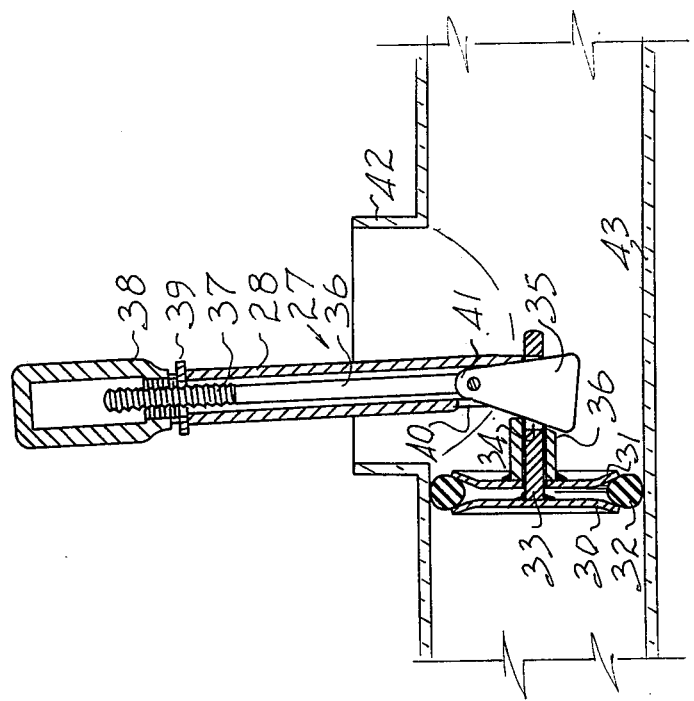
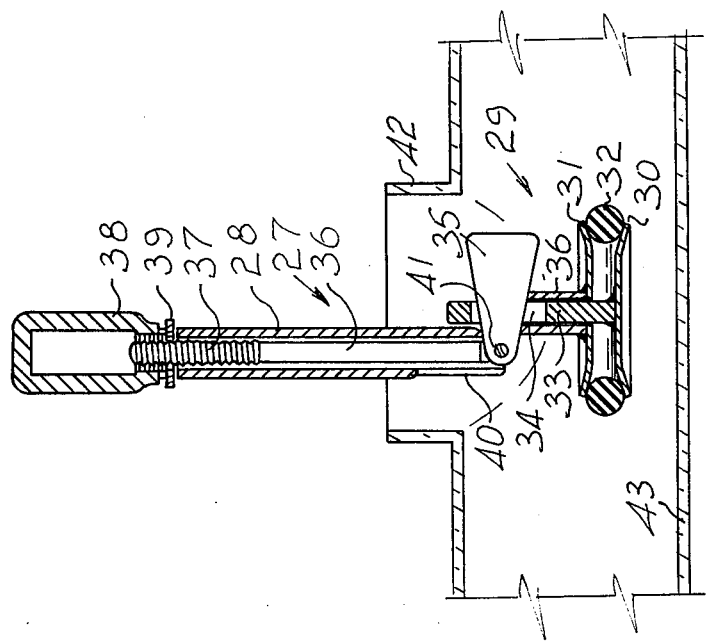

PIPE SEALING APPARATUS

This invention relates to pipe sealing apparatus intended for the purpose of sealing drain or sewer pipes for testing purposes with access by way of transverse pipes leading into the drain or sewer pipes.

BACKGROUND OF INVENTION

It is presently common practice, when a section of sewer pipes perhaps newly laid, have to be tested to ensure these will withstand selected hydraulic pressures, that a sealing device be inserted the access for insertion being by way of a pipe joining in a T-section to the main sewer pipe or drain pipe such as a vertical riser.

A most common device presently used for effecting such closure for testing purposes is an inflatable balloon like member which is inserted in an uninflated condition through a vertical riser, and by pushing the uninflated member into the transverse pipe perhaps by using a rod and then inflating the balloon like member by means of a flexible conduit extending from the balloon like member to a surface, a sealing effect is obtained.

A first problem occurs in that if the walls of the pipe to be sealed are smooth, it is very often difficult to achieve sufficient inflation pressure without damage to the inflation member to ensure that the member will retain its position against the substantial hydraulic head that can arise under testing conditions.

If excessive pressure is required, the inflatable member can be damaged.

A second problem involves the difficulty of releasing the sealing pressure when the testing of the pipes has been completed.

It will be recalled that there is a substantial water head which is being held by the inflated member and as the inflation is reduced, this pressure will cause the sealing member upon a partial inflation to be pushed along the direction of the release of pressure.

In practice such release can result in the inflatable member being substantially wrenched along the pipe which can cause potential damage to the means such as the hollow conduit secured to the inflatable member and suddenly this can be subjected to substantial tension holding the inflatable member from being swept down the further length of the sewage pipe.

Furthermore many of the sewage pipes have some sharply projecting portions and these can result in the inflatable member tearing as it is swept past such sharp projections.

Where the vertical riser is a very short distance from a surface, a hand held sealing device has been used in which co-reacting plates expand a resilient sealing ring.

Such a device must be maneouvred by hand down the vertical portion of the pipe and then around the lower bend and then along the inner lower tube in which position a support arm extending along the axial direction of the sewage tube to be sealed is then held and suitable means provided whereby to effect an outward expansion of the resilient sealing ring.

Such an arrangement, while avoiding some of the problems of the inflatable member, still subjects the user to substantial difficulties when releasing sealing engagement when a head of water is behind the seal and such devices tend to be very quickly swept along the pipe so that the operator must exert substantial pressure by hand to stop such sealing device being swept along the pipe. Such devices are difficult to use, may result in injury to the user or may result in the apparatus being swept along the pipe which could result in an intolerable blockage at an inaccessible place further along the pipe.

Such then is the presently known art.

OBJECT OF THIS INVENTION

The object of this invention generally is to provide an apparatus which avoids the problems of being subject to a short life such as the inflatable member and at the same time can be produced at prices which are not excessively more expensive than such inflatable members and at the same time can be manufactured so as to ensure less difficulty in locating the device in a sealing position and achieving a seal and furthermore enabling release of sealed water to be effected again without difficulties that hitherto have been found.

STATEMENT OF INVENTION

The invention can in one concept be said to reside in a pipe sealing device having a sealing head of a type including an expandable resilient sealing ring the characterisation of the invention being that the sealing head is supported by a support arm in such a way that the sealing head can be variously orientated so as in a first position so that the axis of the resilient sealing ring is aligned generally with the elongate direction of the support arm and in a second position such axis is transverse to the elongate direction of the support arm and finally in a third position while in such transverse position the resilient ring can be expanded whereby to effect the sealing action against a sewage pipe.

By having what in effect could be termed an orientatable sealing head, the device achieves the first feature of being readily manoeuvrable into position down a vertical riser and second when in such position can readily be orientated remotely so that the sealing ring can be in a sealing position.

Because the support arm is then transverse to the axial direction of the resilient sealing ring, the support arm acts as a stop against the side of the vertical riser upon release of resilient sealing pressure so avoiding any possibility of the sealing member being swept down the pipe. Subsequent removal of the sealing head is therefore also very simple in which the head can be orientated back to have its axis generally aligned to the elongate direction of the support arm and then simply withdrawn.

The feature of an orientable head is desirably coupled with a common action control arm so that the device can be kept very simple and therefore less costly in manufacture.

For this purpose there is provided a wedge shaped member which is secured between co-reacting members coupled to outwardly flared adjacent plates between which is held the resilient sealing ring and by appropriate coupling and positioning of a control arm engaging such wedge shaped member, by relative movement of the control arm with respect to the support arm, the three selected positions can be achieved through the one control arm being simply shifted with respect to the support arm.

It is desirable that the sealing head be most simply coupled to the support arm and this is by way of a pivotal connection and furthermore the co-reacting members are best constituted by a central member acting in a slidable manner within a sleeve. The wedge can act by being pulled through a slot in the central member so as to effect pressure between the sleeve and the central member. One form of the invention could then be said to reside in a drain pipe sealing device including a support arm having a pivotally secured to an end thereof a sealing head, the sealing head including a resilient sealing ring held between outwardly flared adjacent plates secured to a central member and a sleeve, the relative positions of said central member and sleeve being controlled by a wedge shaped member passing through a slot in the central member and acting against the sleeve, a control arm having one end pivotally secured to an apex of the wedge shaped member and another end secured to a control member joined to the support arm, the arrangement being such that, in a first position of the control member relative to the support arm, the sealing head can be in a position in which the resilient sealing ring is in a retracted position, and the axial direction of the resilient sealing ring is substantially along the elongate direction of the resilient sealing ring, in a second position achieved by shifting of the control member relative to the support arm, the axial direction of the resilient sealing ring is substantially transverse to that of the elongate direction of the resilient sealing ring with resilient sealing ring in the retracted position, and, in a third position of the control member relative to the support arm, the resilient sealing ring is compressed into a expanded sealing position while in the said transverse axial direction to the elongate direction of the support arm.

The invention could be said to reside in a drain pipe sealing device including a support arm, and a sealing head secured to an end of the support arm, the sealing head including a resilient ring and co-reactive members supported for relative movement one with respect to the other whereby in one position to cause an outward peripheral sealing expansion of a resilient sealing ring, and in a second position the resilient sealing ring being retracted from the sealing position, the invention being characterised in that the sealing head is secured to the support arm by means such that the sealing head can be caused to assume one of either two positions relative to the elongate direction of the support arm, a first position being one in which the resilient sealing ring has its axis aligned substantially parallel with respect to the elongate direction of the support arm, and a second position being that in which the resilient sealing ring has its axis aligned transversly to the elongate direction of the support arm.

Such statements are not intended to be comprehensive statements of the scope of the invention which may be gathered from reference to a company in claims at the end of this specification.

DESCRIPTION OF PREFERRED EMBODIMENTS

The invention shall now be further explained and described how it may be best put into effect by reference to embodiments which shall be described with the assistance of drawings in which, FIG. 1 is a side elevation of a first embodiment this unit being applicable for use with vertical rises of substantial height, FIG. 2 is a cross-sectional view of the lower portion of the first embodiment showing the sealing head in a position in which it is adapted to be moved down a vertical riser, FIG. 3 is a cross-sectional view of the same sealing head portion as FIG. 2 showing however the sealing head in a transversely oriented position and with a resilient sealing ring effecting sealing engagement against the walls of a pipe, FIG. 4 is a cross-sectional view of a second embodiment the unit being more applicable for use where vertical rises are of short height and being shown in a first position adapted for introducing the device through the short vertical riser into the sewage pipe, and FIG. 5 is a cross-sectional view of the same second embodiment as shown in FIG. 4 with however the sealing head being shown in a position with its axis transverse to the elongate direction of the support arm and with the resilient sealing ring in an expanded sealing position.

Referring now to the first embodiment as shown in FIGS. 1 2 and 3, the drain sealing device 1 includes a support arm 2 which has pivotally secured at an end 4 thereof a sealing head 5.

The sealing head 5 includes two outwardly flared adjacent plates 6 and 7 which have retained therebetween a resilient sealing ring 8 made from resilient material such as rubber.

Secured to plate 6 is a central member 9 which has passing therethrough a slot 10 and which at a further end is bifurcate the legs of which bifurcate portion extend around the sides of the support arm 2 and these are retained in pivotal connection to the support arm by pin 11. Plate 7 has secured thereto a sleeve 12 the end of which extends so as to overlap the slot 10. Passing through the slot 10 is a wedge shaped member 13.

A control arm 14 has an end pivotally secured to an apex 15 of the wedge shaped member 13 by passing into a slot not shown and being retained therein by reason of pin 16.

The position of the control arm 14 is governed by the position of control means 17 which include a control lever 18 and end of which 19 is secured to an end of the control arm 14 and a mid portion of which is pivotally secured to an upper end of the support arm 2.

Secured also to the control lever 18 is a serrated plate 20 the serrations 21 being such as to be engagable by pivot engagement of engaging plate 22.

A stop bracket 23 is secured to a side of the support arm 2 so as to limit orientation of the sealing head 5 when this is being moved from a substantially parallel orientation with respect to the support arm 2 to a transverse position.

The mechanical operation of the device will be apparent from an examination of the drawings.

Nonetheless it will be seen that in FIG. 2 control lever 18 has had the handle portion 24 fully raised so that the control arm 14 is in a lowermost position and this will result in the axis of the resilient sealing ring being substantially that of the elongate direction of the support arm 2. This indeed is the position as shown in FIG. 2 and it will be seen that this allows for easy positioning of the sealing head down a vertical riser 25. When the sealing head 5 reaches the bottom of the vertical riser 25, then with the engaging plate still raised from engagement of the serrations 21, the handle of the control lever 18 is lowered and this results in an orientation of the sealing head around the pivot pin 11 so that this assumes a second position with however in the first instance the resilient sealing ring still assuming a retracted position which is that as shown in FIG. 2.

FIG. 3 then shows the arrangement in a third position in which the control lever 18 has been further depressed at its handle end 24 and such position is maintained by a lowering of the engaging plate 22 so as to engage the serrations 21 this action effecting a pulling of the wedge shaped member 13 whereby to cause a compression action between the plates 6 and 7 which in turn causes the resilient sealing ring to be compressed and expand out into a sealing condition against the walls of sewage pipe 26.

Subsequent to the testing having occurred, release of the sealing pressure can be achieved by lifting of the engaging plate 22 from engagement with the serrations 21 and flow of water past the resilient sealing ring can only result in the support arm 2 being pushed back against the wall of the vertical riser 25.

Such pressure will have little effect upon the device as such and after the flow has subsided, the control lever can be further raised so as to reorientate the sealing head 5 to the position as shown in FIG. 2 and the sealing device can then be fully removed by removal of the vertical riser.

Reference is now made to the second embodiment as shown in FIGS. 4 and 5.

This device is generally of similar principle to that as shown in FIGS. 1, 2 and 3 but is intended to be used where the vertical riser is of short height. The construction of the device therefore is somewhat less complex and therefore can also be somewhat cheaper.

The drain pipe sealing device 27 includes a support arm 28 which has secured to a lower end thereof a sealing head 29.

The sealing head includes outwardly flared adjacent plates 30 and 31 which have retained therebetween a resilient sealing ring 32. Secured to plate 30 is a central member 33 which has a slot therethrough through which passes a wedge shaped member 35. Secured to plate 31 is a sleeve 36 the ends of which overlap the slot 34.

In this particular case the sealing head is secured to the support arm 28 by the indirect means of pivotal support through the wedge shaped member 35 with a control arm 36. The control arm 36 passes through the hollow core of the support arm 28 and said control arm 36 has an upper end which has a threaded portion 37 which engages a correspondingly threaded control member 38. There is a washer 39 positioned between the control member 38 and the upper edge of the support arm 28.

There are slots 40 and 41 in the lower end of the sides of the support arm 28 so as to allow the action of orientation and expansion of the resilient sealing ring to take place.

The action is clearly shown by the sequential arrangement of the device as in FIG. 4 and FIG. 5 the arrangement in the FIG. 4 being the arrangement in which the sealing device 27 is inserted through the vertical rise of 42 into the main drain or sewer pipe 43. In this position, the control member 38 is rotated so as to draw the control arm 36 up with respect to the support arm 28 which first has the effect of orientating the sealing head 29 which can generally be referred to as having an orientation the same as the axial direction of the resilient sealing ring 32 so that this changes from being in a position substantially parallel to the support arm 28 to a position where this is generally transverse to the elongate direction of the support arm 28 as shown in FIG. 5.

By continued rotation of the control member 38 there is caused a pulling together of the plates 30 and 31 which causes the resilient sealing ring 32 to push upwards into sealing engagment with the walls of the drain pipe 43.

Upon release of the sealing pressure this may only cause the device 27 to push backwards so that at worst the edge of the support arm 28 is pushed against the wall 42 of the short vertical riser. This is easily controlled by any user and will not cause any damage either to the user or the device.

Removal of the device 27 is achieved in a manner following in reverse the method of insertion.

I claim:

1. A drain pipe sealing device including a support arm, and a sealing head secured at an end of the support arm, the sealing head including a resilient sealing ring and coreactive members supported for relative movement one with respect to the other to cause outward peripheral sealing expansion of the resilient sealing ring to a sealing position and to allow the resilient sealing ring to contract from the sealing position, the invention being characterized in that the sealing head is secured to the support arm by means including control means operable to move the sealing head to a first position in which the resilient sealing ring has its axis aligned substantially parallel with respect to the elongate direction of the support arm and to a second position in which the resilient sealing ring has its axis aligned transversely to the elongate direction of the support arm, said control means including a cam member operable to provide the relative movement between the co-reactive members to cause the outward peripheral sealing expansion of the resilient sealing ring.

2. A drain pipe sealing device as in claim 1 further characterized in that the control means include a stop member which cooperates with the support arm to limit the transversely aligned orientation of the sealing head with respect to the elongate direction of the support arm.

3. A drain pipe sealing device as in claim 1 further characterised in that the co-reactive members are slidable one with respect to the other and the cam member is positioned relative to the co-reactive members so as to, in one position effect a pressure between the co-reactive members to effect an outward peripheral extension of the resilient sealing ring, and in a second position, to allow the co-reactive members to assume a position whereby the position of the resilient sealing ring is in a contracted position.

4. A drain pipe sealing device as in the last preceding claim in which the said cam member is of wedge shape and the control means including a control arm are secured to an apex of the wedge shape, the wedge being positioned so as to pass between oppositely facing surfaces provided by the co-reactive members.

5. A drain pipe sealing device according to claim 1 wherein the control means includes a control arm operably connected at one end to a control member and movable with respect to the support arm and means to retain the control member in a selected position.

6. A drain pipe sealing device including a support arm having pivotally secured to an end thereof a sealing head, the sealing head including a resilient sealing ring held between outwardly flared adjacent plates secured to a central member including a slot and a sleeve, the relative positions of which are controlled by wedge shaped member passing through the slot in the central member and acting against the sleeve, a control arm having one end pivotally secured to an apex of the wedge shaped member and another end secured to a control member joined to the support arm, the arrangement being such that, in a first position of the control member relative to the support arm, the sealing head can be in a position in which the resilient sealing ring is in a retracted position, and the axial direction of the resilient sealing ring is substantially along the elongate direction of the resilient sealing ring, in a second position achieved by shifting of the control member relative to the support arm, the axial direction of the resilient sealing ring is substantially transverse to that of the elongate direction of the resilient sealing ring with the resilient sealing ring in the retracted position, and, in a third position of the control member relative to the support arm the resilient sealing ring is compressed into a expanded sealing position while in the said transverse axial direction of the elongate direction of the support arm.

7. A drain pipe sealing device including a support arm having a sealing head pivotally secured to an end thereof and control means including a control member positioned adjacent the end of the support arm remote from the sealing head, said sealing head including a resilient sealing ring and co-reactive members supported for relative movement one with respect to the other to cause outward peripheral sealing expansion of the resilient sealing ring to a sealing position and to allow the resilient sealing ring to retract from the sealing position, said control means also including a control arm operable by operation of said control member to move said sealing head to a first position in which said resilient sealing ring has its axis aligned substantially parallel with respect to the elongate direction of said support arm and to a second position in which said resilient sealing ring has its axis aligned transversely to the elongate direction of said support arm, said control means also including a cam member operable upon operation of said control member to provide said relative movement between said co-reactive members to cause said outward peripheral sealing expansion of said resilient sealing ring.

* * * * *